(12) United States Patent
Andrew (10) Patent No.: US 6,389,591 B1
(45) Date of Patent: *May 14, 2002

(54) METHOD AND APPARATUS FOR DETERMINING PREFERRED CONTROLS FOR AN UPGRADABLE OPERATING SYSTEM

(75) Inventor: Felix Gerard Torquil Ifor Andrew, Seattle, WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/146,615

(22) Filed: Sep. 3, 1998

(51) Int. Cl.[7] .................................................. G06F 9/44
(52) U.S. Cl. ........................................ 717/169; 717/175
(58) Field of Search ............................ 395/712; 717/11, 717/169, 175

(56) References Cited

U.S. PATENT DOCUMENTS

| | | | | |
|---|---|---|---|---|
| 4,799,145 A | * | 1/1989 | Goss et al. ..................... 713/1 |
| 5,179,667 A | * | 1/1993 | Iyer ............................ 711/167 |
| 5,257,376 A | * | 10/1993 | Beck et al. .................... 713/1 |
| 5,291,585 A | * | 3/1994 | Sato et al. ..................... 710/10 |
| 5,452,455 A | * | 9/1995 | Brown et al. ................ 713/100 |
| 5,504,801 A | * | 4/1996 | Moser et al. .................. 379/29 |
| 5,513,351 A | * | 4/1996 | Grantz ........................ 707/200 |
| 5,537,596 A | * | 7/1996 | Yu et al. ...................... 717/168 |
| 5,652,884 A | * | 7/1997 | Palevich ........................ 713/1 |
| 5,666,293 A | * | 9/1997 | Metz et al. ................. 709/220 |
| 5,675,520 A | | 10/1997 | Pitt, III et al. ................. 703/23 |
| 5,675,748 A | * | 10/1997 | Ross ........................... 710/104 |
| 5,675,805 A | * | 10/1997 | Boldo et al. ................. 717/114 |
| 5,701,477 A | * | 12/1997 | Chejlava, Jr. ................... 713/2 |
| 5,867,714 A | * | 2/1999 | Todd et al. .................. 717/172 |
| 5,933,645 A | * | 8/1999 | Wallack ...................... 717/170 |
| 5,950,007 A | * | 9/1999 | Nishiyama et al. ......... 717/161 |
| 5,959,624 A | * | 9/1999 | Johnston, Jr. et al. ...... 345/334 |
| 6,006,035 A | * | 12/1999 | Nabahi ........................ 717/175 |
| 6,009,274 A | * | 12/1999 | Fletcher et al. ............. 717/173 |
| 6,202,206 B1 | * | 3/2001 | Dean et al. .................. 717/177 |
| 2001/0014968 A1 | * | 8/2001 | Mohammed ................ 717/174 |

FOREIGN PATENT DOCUMENTS

GB  WO96/41260  * 12/1996  ............. G06F/9/45

OTHER PUBLICATIONS

Batory et al., The Design and Implementation of Hierarchical Software Systems . . . , 1992, ACM, p. 355–398.*
"Encyclopedia of Computer Science", Third Edition, IEEE Press, copyright 1993 by Van Nostrand Reinhold, NY, NY 10003, p. 326.

* cited by examiner

Primary Examiner—Kakali Chaki
Assistant Examiner—John Q. Chavis
(74) Attorney, Agent, or Firm—Banner & Witcoff, Ltd.

(57) ABSTRACT

A method for allowing an operating system to be upgraded without destroying the compatibility of applications written for the operating system is disclosed. When an application is created, the application developer identifies in the code of the application whether a control has been customized or not customized by the application. When the application is being executed on the operating system, the operating system can distinguish between customized and non-customized controls so as to be able to provide upgraded controls for those controls that have not been customized.

30 Claims, 4 Drawing Sheets

METHOD AND APPARATUS FOR DETERMINING PREFERRED CONTROLS FOR AN UPGRADABLE OPERATING SYSTEM

FIELD OF THE INVENTION

The invention generally relates to a method for allowing an operating system to be upgraded without destroying the compatibility of applications written for the operating system. By distinguishing between applications which are going to customize the operating system controls from those applications which are not going to customize the operating system controls, the operating system can determine which applications can use upgraded operating system controls when they become available.

BACKGROUND OF THE INVENTION

Many computer systems provide a window-based user interface through which a user can interface with a computer program. A window is an area, typically rectangular, of a display device in which the computer program displays its output. A window may contain several different types of "fields" into which the computer program can display data. For example, in one field the computer program can display a label to be viewed by a user, and in another field the computer program can echo characters entered by a user with a keyboard. Each of these fields is typically implemented as a child window of the window in which they are contained.

Figure 1:
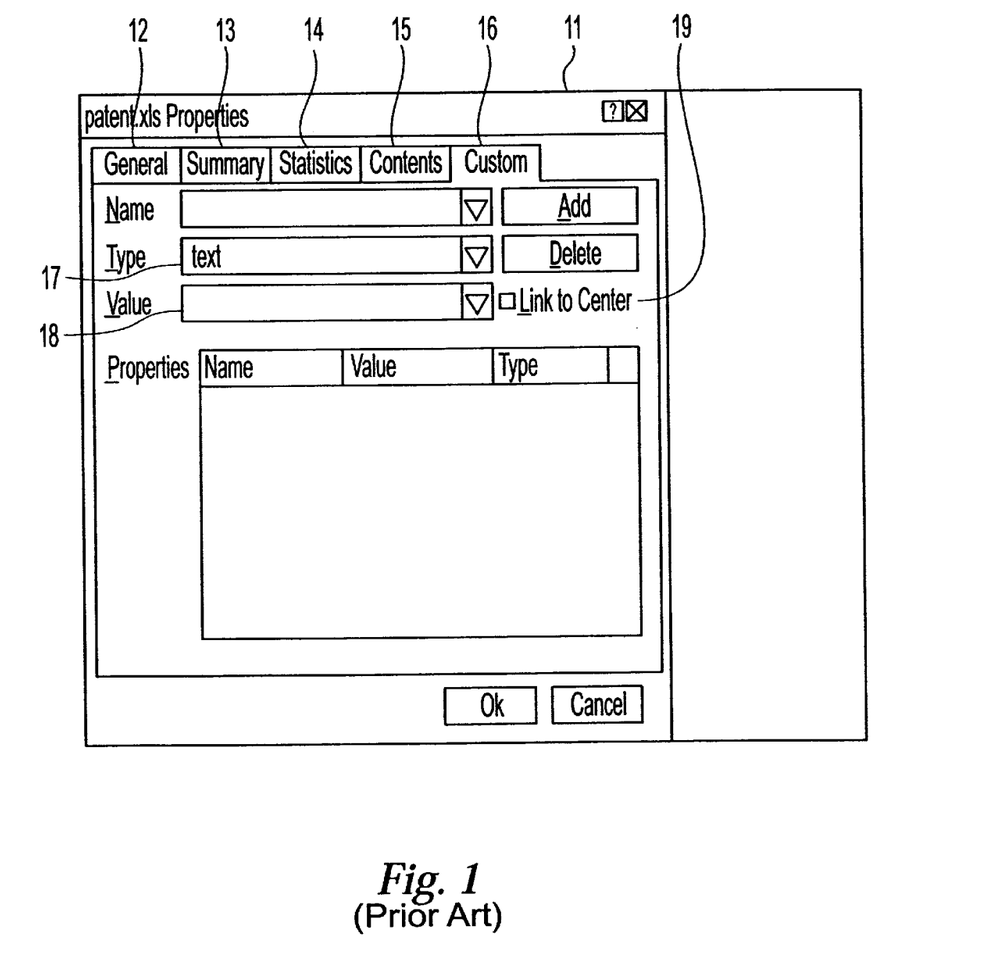
FIG. 1 illustrates a prior art window that contains controls.

FIG. 1 illustrates a prior art window that contains controls. Controls are graphical user interface elements which provide access by a user to any properties or events in an object-oriented programming environment. Because the window shown in FIG. 1 contains information relating to properties of a document, it is known as a property sheet. A property specifies certain characteristics of an object, such as a document. For example, the properties of a document may include the name of the author and the date of creation, whereas the properties of a character may include font and color. The property sheet 11 contains five property pages: general 12, summary 13, statistics 14, contents 15, and custom 16. Each property page is a child window of the property sheet and contains various controls, which are child windows of the property page. For example, in FIG. 1, the custom property page has been selected and contains controls in the form of combobox 17, edit box 18, check box 19. Other examples of property pages are a general property page, a summary property page, a statistics property page, and a contents property page. As shown in FIG. 1, each of these property pages can be accessed by a user.

There are several reasons why it is difficult to innovate the user interface in an operating system. The controls (window classes, like button, edit, etc.) are used not only by the operating system itself, but also by applications that want the same "look and feel" as the operating system. The operating system exposes its controls and encourages developers of applications to make use of them. Many of the controls can be customized to fit particular application needs. This type of customization can be explicit, for example an 'owner draw button', or implicit by 'subclassing' a window.

If an application makes use of either of these customization methods, certain assumptions about the controls are made by the application developer, the predominant one being that those controls will not change behavior dramatically. Applications make use of this kind of customization to make their applications look more exciting, or to add functionality to controls that the operating system did not provide, for example, such as providing hot tracking. Hot tracking, for example, is a mechanism by which a selected button on a user interface can be made to look three dimensional when the pointer is located over the button.

If an application vendor subclasses a button control to add hot tracking, for example, it is difficult for the operating system to add hot tracking in the future. Some applications, however, do not make use of these customization options, often to improve their time-to-market or because it is not a requirement for their customers. Since the operating system can not distinguish between non-customized and customized applications, applications that are not customized suffer because they can not take advantage of upgrades to the operating system that could have been made but are not made for fear of not being compatible with applications which have customized their controls. Failure of an operating system to remain compatible with applications is also known as "breaking" applications.

Currently, there is only a limited solution to this problem. Applications are written to a specific version of the operating system, and the application is marked with this version number, e.g. 3.1 (for Windows® 3.1) and 4.0 (for Windows® 95). The operating system can read the version number and make some use of the version number to determine the "look and feel" the operating system should provide to the application, and what "common dialogs" the application can use. For example, in a single code path, for drawing the edges of a button, the operating system will determine the application version, and draw the edges 'flat or 'raised' depending on the 'look and feel' of that version of the operating system. This is to match the user interface of the application, which may contain its own controls that are 'flat', as was the previous 'look and feel' of the operating system. Modifications such as these are tested very thoroughly, for many months, on thousands of applications to ensure that the modification does not break any of the applications. The levels of change capable are very low, so only minor changes can be made. If it is found that a particular application 'breaks' under the new behavior, a judgement call is made to either include the changed behavior or remove it. If it is decided to keep the new behavior, more code is added to exclude this new behavior for any particular application which will be broken by the new behavior.

Presently, when a developer wants to create a control, such as a button, in an application, the following line of code, for example, can be used:
HWND hwnd=CreateWindow("BUTTON" . . . )
In this case, the developer is explicitly asking for a window whose classname is BUTTON. The operating system provides this window, but may also perform checks against the version number in the application to slightly modify its behavior.

As noted above, developers are free to customize this control, and can modify its behavior by using, for example, the following line of code:
SetWindowLong(hwnd, GWL_WNDPROC,(DWORD) myWndProc)
Once this line of code is used, the myWndProc fiction will override all the windows messages that are sent to the control to add or modify the behavior of the BUTTON control. As a result, it is difficult for the operating system to improve the functionality of the BUTTON control.

SUMMARY OF THE INVENTION

The above-described shortcomings, disadvantages and problems are addressed by the invention by providing a naming convention which distinguishes between controls that will be or may be customized and controls that will not be customized so as to allow the operating system to upgrade its controls without destroying the compatibility of applications which have previously customized the operating system controls.

The controls of an operating system are generally made available for use by applications running on the operating system. The application developer has the option of using the control in the same manner that the operating system uses the control or the developer can customize the control by changing a set of features that define the control. When the control is not going to be customized, the developer identifies in the code of the application that the control will not be customized. Likewise, the developer identifies in the code of the application that the control will be customized.

When the application is running on the operating system and a control is requested, the operating system first determines whether the control is identified as being customized or non-customized. If the control is not going to be customized, the operating system is free to use an upgraded set of features to create the control if they are available. If the control is going to be customized, the operating system will use the specific set of features associated with the control of the specific version of the operating system for which the application was written. Thus, the operating system can be upgraded without fear of breaking applications which have customized their controls.

BRIEF DESCRIPTION OF THE DRAWINGS

The invention will now be described with reference to the following drawings in which like reference numerals refer to like elements and wherein.

DETAILED DESCRIPTION

Before describing the invention in detail, a suitable computing environment in which the invention may be implemented will now be described with reference to FIG. 2. Although not required, the invention will be described in the general context of computer-executable instructions, such as program modules, being executed by a personal computer. Generally, program modules include routines, program, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 2:
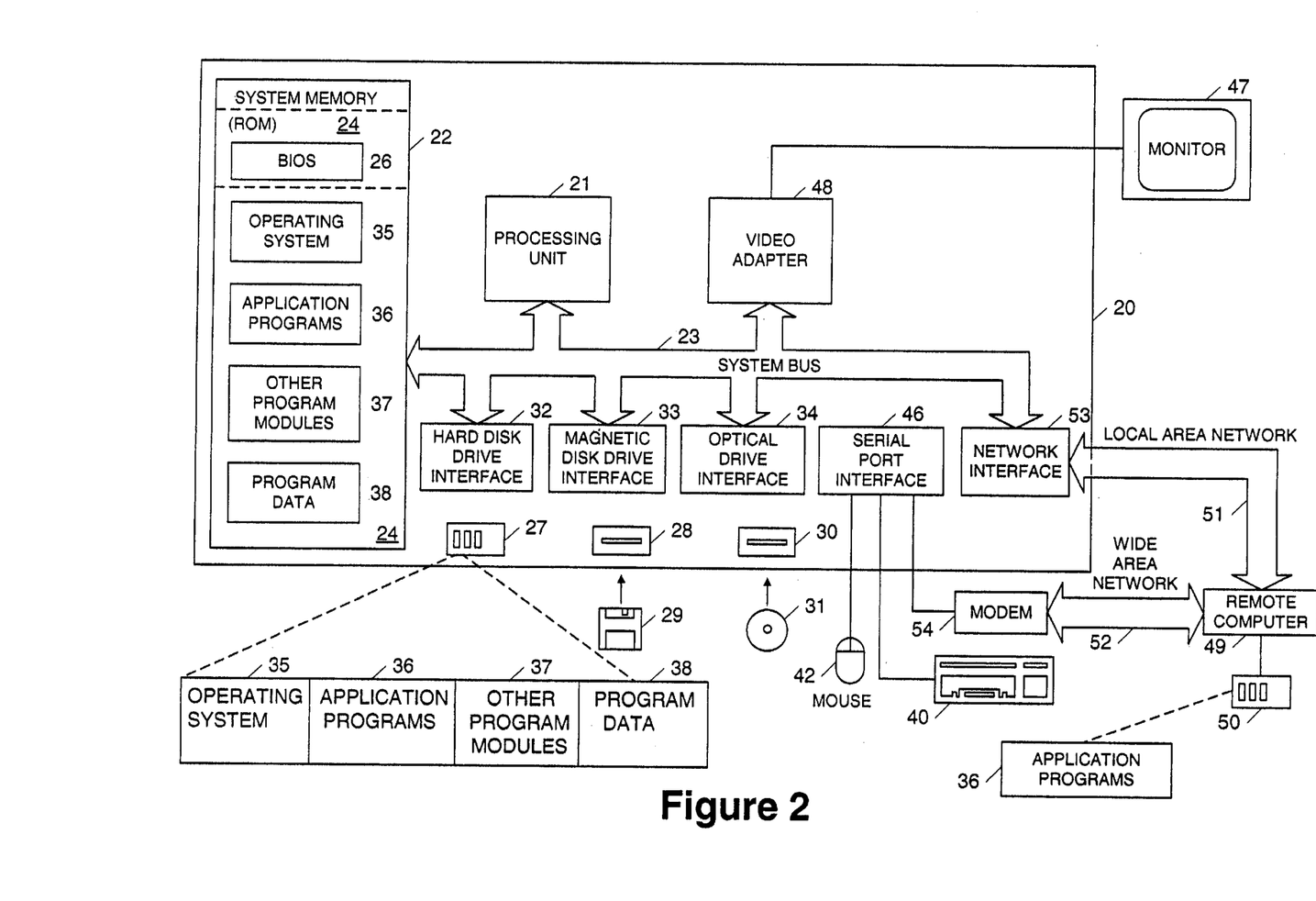
FIG. 2 is a block diagram showing the hardware and operating environment in conjunction with which embodiments of the invention may be practiced.

With reference to FIG. 2, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or a memory controller, a peripheral bus, and a local bus using any of a variety of bus architectures. The system memory includes read only memory (ROM) 24 and a random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from and writing to a removable magnetic disk 29, and an optical disk drive 30 for reading from and writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In accordance with the practices of persons skilled in the art of computer programming, the invention is described below with reference to acts and symbolic representations of operations that are performed by the computer system 20, unless indicated otherwise. Such acts and operations are sometimes referred to as being computer-executed. It will be appreciated that the acts and symbolically represented operations include the manipulation by the CPU 21 of electrical signals representing data bits which causes a resulting transformation or reduction of the electrical signal representation, and the maintenance of data bits at memory locations in the memory system 22 to thereby reconfigure or otherwise alter the computer system's operation, as well as other processing of signals. The memory locations where data bits are maintained are physical locations that have particular electrical, magnetic, optical, or organic properties corresponding to the data bits.

The computer system 20 preferably uses the Windows® 95 or Windows® 98 client server operating system. However, other client/server operating systems (e.g. Windows® NT, O/S2 by IBM, Mac OS, UNIX, Windows® CE, etc.) can also be used. A client/server operating system is an operating system which is divided into multiple processes of two different types: server processes, each of which typically implements a single set of services, and client processes, which request a variety of services from the service processes. Object oriented programming is used to design the client/server operating system, and applications which run under the client/operating system, where objects represent system resources.

For example, the Windows® 95 client/server operating system provides shareable resources, such as files, memory, processes and threads, which are implemented as "objects" and are accessed by using "object services." As is well known in the art, an "object" is a data structure whose physical format is hidden behind a type definition. Data structures, also referred to as records or formats, are organization schemes applied to data so that it can be interpreted, and so that specific operations can be performed on that data. Such data structures impose a physical organization on the collection of data stored within the computer memory 22 and represent specific electrical, magnetic or organic elements.

An "object type," also called an "object class," comprises a data-type, services that operate in instances of the data type, and a set of object attributes. An "object attribute" is a field of data in an object that partially defines that object's state. An "object service" implements and manipulates objects, usually by reading or changing the object attributes. "Object oriented design" is a software development technique in which a system or component is expressed using objects.

An object typically has two components: a function table, containing a pointer to each object member function (i.e., sometimes known as an object method) defined in the object's class, and a data block, containing the current values for each object variable (i.e., data members, sometimes known as an object property). An application has some reference to an object through the object pointer. An application obtains this object reference by using some type of function call (direct or implied) in which that function allocates an object block in computer memory, initializes the function table, and returns the reference to the computer memory to an application. The computer memory may be local or distributed on a remote computer.

The invention provides a way for allowing a developer to upgrade an operating system without destroying the compatibility of the operating system with applications which have customized controls provided by the operating system. More specifically, the invention provides a way for the operating system to determine if the application being run by the operating system is going to customize its controls. The indication is provided in the code when the control in the application is created. As a result, applications that are not customizing the controls are able to use the new improved controls provided by the operating system without having to ship an upgrade of the application. However, the innovations in the controls are not provided to those applications that are customizing the controls. Those applications still use the previous version of that control as will be explained below.

According to the invention, when an application makes a request for an interface, a control, etc., the operating system looks for an indication in the code to determine if the operating system can use upgraded features or methods, properties and events for the requested control or interface if they are available. According to a first embodiment of the invention, the requested control or interface classname is annotated in some manner if the control or interface is not going to be customized and thus can be upgraded if an upgrade to the operating system control becomes available. For example, the classname can begin and/or end with the annotation of percentage signs (%) or the like. Thus, the code for the classname BUTTON illustrated above could be written as HWND hwnd=CreateWindow ("%BUTTON%" . . . )

to indicate that the control BUTTON will not be customized by the application developer. Since the control is not going to be customized, the operating system can use an upgraded set of features for the control if an upgrade to the operating system control becomes available. In this embodiment, controls which are not annotated are treated as if the controls are going to be customized and the features of the controls are not upgraded even if an upgrade becomes available.

When an upgrade to a control is made available to the operating system, the upgraded control is identified by a new classname, wherein each classname has a separate set of features defining the control. The classname can be stored in a registry or some other customizable/extensible mechanism. Each of the set of features can be stored in resource files which are identified in the registry. By using resource files, various changes can be made to the arrangement and content of controls without the need for modifying the computer program which displays the controls. For example, the controls corresponding to the labels of various boxes in a window can be changed by simply modifying or creating a new resource file. The next time the program is executed after an upgrade, the program will open the resource file corresponding to the selected classname.

It will be understood by one skilled in the art that indications other than percentage signs (%) can also be used to annotate the control and the invention is not limited thereto. Furthermore, it will be understood by one skilled in the art that the annotated control can be interpreted to mean that the controls will be or may be customized and the features of the controls should not be upgraded even if an upgrade becomes available and the controls that have not been annotated can be upgraded if an upgrade becomes available.

Figure 3:
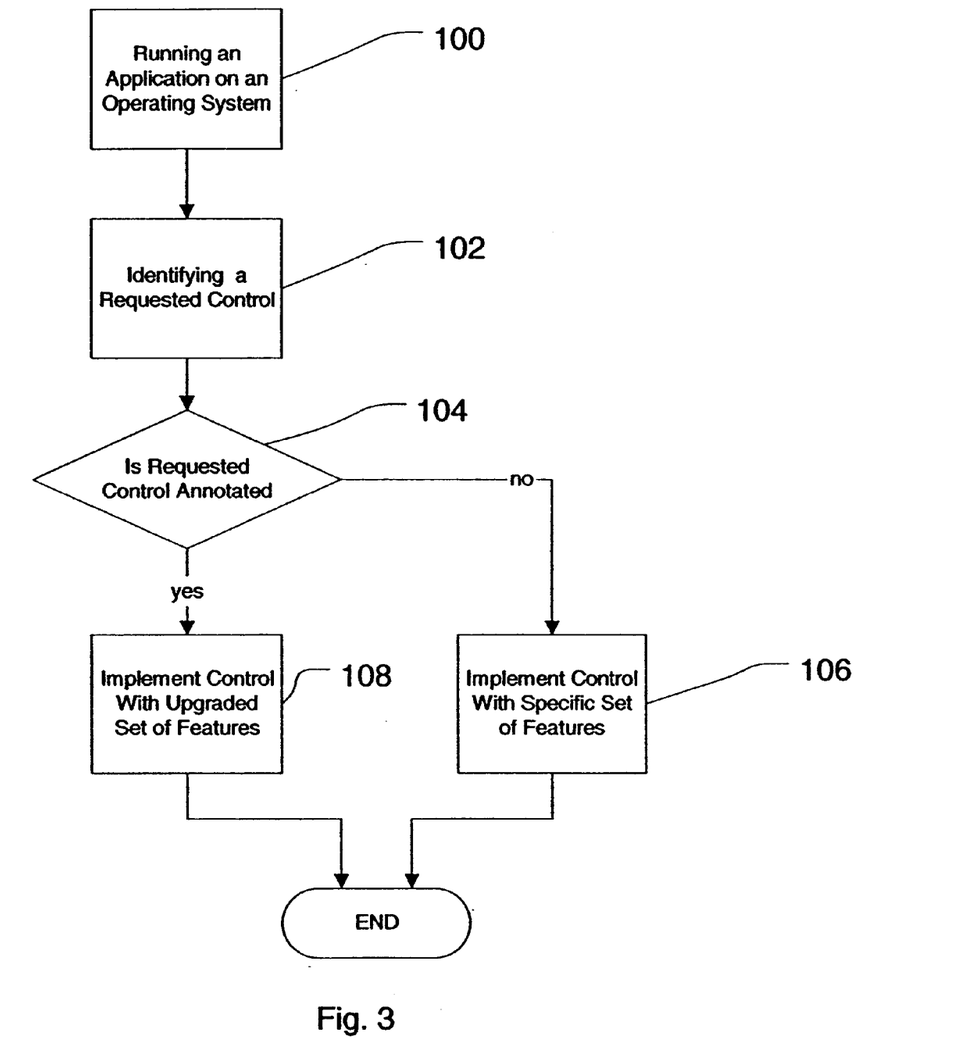
FIG. 3 is a flow chart illustrating one embodiment of the invention.

FIG. 3 is a flow chart illustrating the first embodiment of the invention. In step 100, it is determined whether an application is being run on an operating system. When an application is running, the application will request various controls, such as BUTTON. When the operating system receives a request for a control in step 102, the operating system determines whether the requested control has been annotated in the code in step 104. If the operating system determines that the control was not annotated, i.e., the control will be customized, the operating system looks for the version number of the operating system that the application was written for and loads the control with the appropriate set of features in step 106. If the operating system determines that the control has been annotated, the operating system determines whether the set of features for the requested control has been upgraded and preferably loads the most recently upgraded set of features for the requested control in step 108. Thus, controls in applications which will not be customized can take advantage of any upgrades to the controls of the operating system while controls that will or may be customized are not affected by the upgrade to the controls of the operating system. Moreover, when the application requests an annotated control, the operating system prevents any level of customization or modification of the control by the application.

Figure 4:
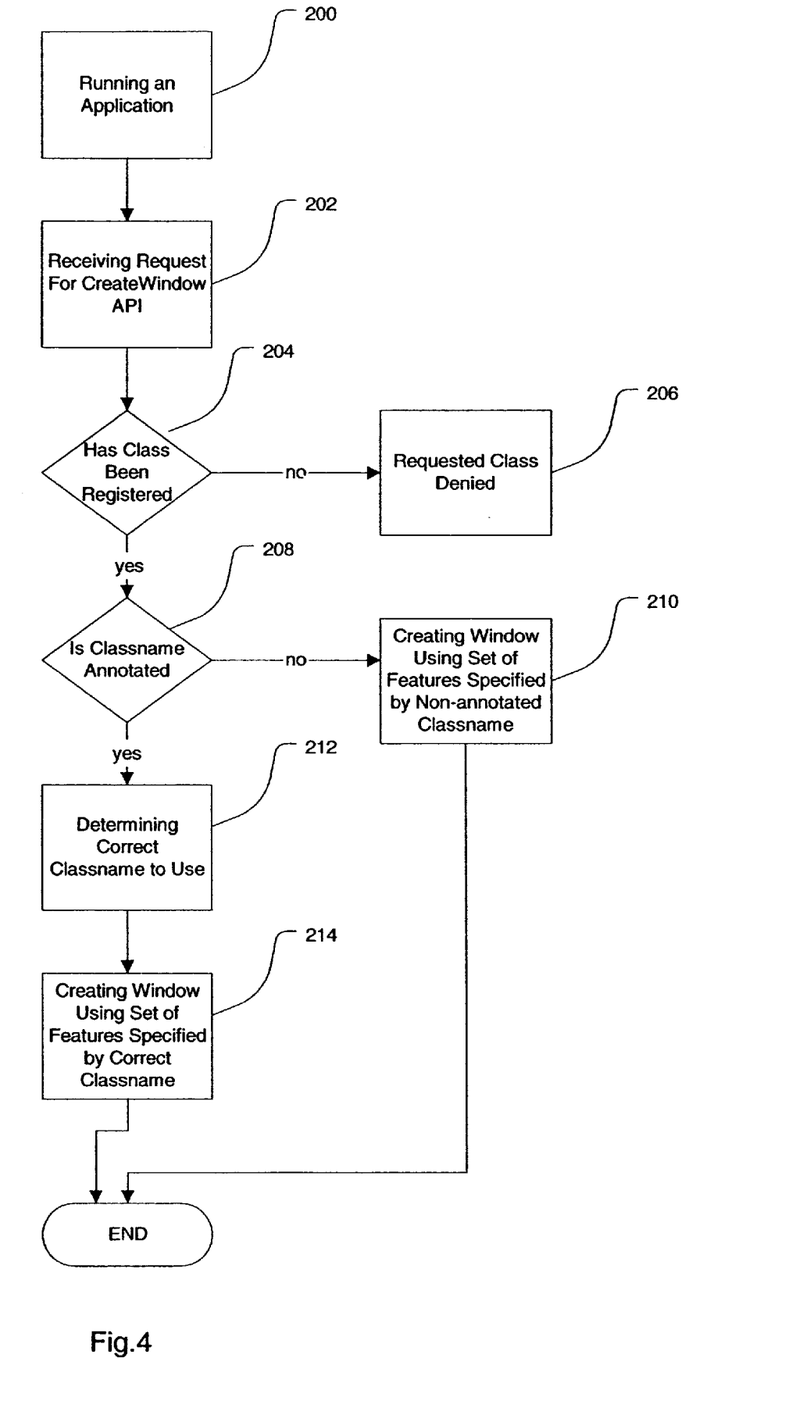
FIG. 4 is a flow chart illustrating the invention in a specific operating system.

An example of one embodiment of the invention will now be described with reference to the Microsoft Windows® operating system but one skilled in the art will understand the invention can also be used in other operating systems where controls are created and can be customized. In Windows®, the Create Window Application Programming Interface (API) is implemented in USER32.DLL. As illustrated in FIG. 4, when the operating system is running an application, in step 200, and a call is made to the Create Window API, in step 202, the CreateWindow API then determines if the class has been registered , in step 204. If the class has not been registered, the request is denied in step 206. If the class has been registered, the CreateWindow API then determines if the classname has been annotated in some manner, i.e., is the classname surrounded by percentage signs (%) or the like, in step 208. If the classname has not been annotated, the operating system treats the requested control as if the control is going to be customized. Thus, the operating system creates a window using a set of features which are stored in a resource file for the non-annotated classname in step 210. If the classname is annotated, the CreateWindow API determines which classname to use, perhaps using the registry or some customizable/extensible mechanism in step 212. Once the CreateWindow API has looked up the correct classname, the window is created using a set of features which are stored in a resource file for the selected classname in step 214. Thus, the operating system creates a window using a set of features which are stored in a resource file for the non-annotated classname in step 210. If the classname is annotated, the CreateWindow API determines which classname to use, perhaps using the registry or some customizable/extensible mechanism in step 212. Once the CreateWindow API has looked up the correct classname, the window is created using a set of features which are stired in a resource file for the selected classname in step 214.

If the user does not like the new functionality provided by the new control, the user can uninstall the newer controls and revert back to the previous controls. By uninstalling the new controls, the new controls are removed from the registry or the customizable/extensible mechanism. As a result, the old controls are the most current in the registry and will be selected by the CreateWindow API.

Although the present embodiment of the invention has been described in detail, it should be understood that various changes, alterations and substitutions can be made therein without departing from the spirit and scope of the invention as defined by the appended claims.

I claim:

1. A method for allowing an operating system to be upgraded without destroying the compatibility of applications written for the operating system, comprising the steps of;

identifying a request for a control by an application being executed on the operating system;

determining whether the application has identified the control as customizable;

implementing the control with an upgradable set of features if the control has not been identified as customizable; and implementing the control with a non-upgradable set of features if the control has been identified as customizable.

2. The method according to claim 1, wherein the application is prevented from customizing the control when the control has been implemented with the upgradable set of features.

3. A method of implementing an interface in an operating system, comprising the steps of:

a). defining an application to run on the operating system;

b). requesting an interface predefined in the operating system, the interface having first methods, properties and events;

c). determining in the operating system if at least one of an upgradable method, property and event is available as a result of an upgrade of the operating system;

d). implementing the interface using the at least one of an upgradable method, property and event when a first identifier is used in an application; and e). implementing the interface using the first methods, properties and events when the first identifier is not used in the application.

4. The method according to claim 3, wherein the application is prevented from customizing the interface when the first identifier is used.

5. The method according to claim 3, wherein the operating system examines a control registry to determine the appropriate methods, properties and events for the application when the first identifier is used.

6. The method according to claim 3, wherein the interface is implemented using a third set of methods, properties and events when a third identifier is used in the application.

7. The method according to claim 3, wherein at least one of the most recently upgraded methods, properties and events is used to implement the application when the first identifier is used.

8. The method according to claim 3, wherein at least one of a most advanced methods, properties and events is used to implement the application when the first identifier is used.

9. A computer-readable medium having computer executable instructions for performing the steps recited in claim 3.

10. A method of implementing a control in an operating system, comprising the steps of:

a). defining an application to run on the operating system;

b). requesting a control predefined in the operating system, the control having a first set of features;

c). determining in the operating system if at least one of an upgradable feature is available as a result of an upgrade in the operating system;

d). implementing the control using at least one of an upgraded feature when a first identifier is used in an application; and e). implementing the control using the first set of features when the first identifier is not used in the application.

11. The method according to claim 10, wherein the application is prevented from customizing the interface when the first identifier is used.

12. The method according to claim 10, wherein the operating system examines a control registry to determine the appropriate features for the application when the first identifier is used.

13. The method according to claim 10, wherein the control is implemented using a third set of features when a third identifier is used in the application.

14. The method according to claim 10, wherein at least one of the most recently upgraded features is used to implement the application when the first identifier is used.

15. The method according to claim 10, wherein at least one of a most advanced feature is used to implement the application when the first identifier is used.

16. A computer-readable medium having computer executable instructions for performing the steps recited in claim 10.

17. The method according to claim 10, wherein the features define the look and feel of the control.

18. A computer system for implementing a control when an application is run on an operating system, comprising:

means for receiving a request for a control;

means for implementing the control with an upgradable set of features when the control is identified by a first identifier; and means for implementing the control with a non-upgradable set of features when the control is not identified by the first identifier.

19. The method according to claim 18, wherein the application is prevented from customizing the interface when the first identifier is used.

20. The computer system according to claim 18, wherein the operating system examines a control registry to determine the appropriate set of upgradable features when the first identifier is used.

21. A computer system for implementing an interface when an application is run on an operating system, comprising:

means for receiving a request for an interface;

means for implementing the interface with an upgradable set of methods, properties and events when the interface is identified by a first identifier, said upgradable set of methods, properties and events being available as a result of an upgrade to the operating system; and means for implementing the interface with a non-upgradable set of methods, properties, and events when the interface is not identified by the first identifier.

22. The method according to claim 21, wherein the application is prevented from customizing the interface when the first identifier is used.

23. The computer system according to claim 21, wherein the operating system examines a control registry to determine the appropriate set of upgradable methods, properties and events when the first identifier is used.

24. A method for implementing a control when an application is run on an operating system, comprising the steps of:

receiving a request for a control;

implementing the control with an upgradable set of features when the control is identified by a first identifier; and implementing the control with a non-upgradable set of features when the control is not identified by the first identifier.

25. The method according to claim 24, wherein the application is prevented from customizing the interface when the first identifier is used.

26. The method according to claim 25, wherein the operating system examines a control registry to determine the appropriate set of upgradable features when the first identifier is used.

27. A method of implementing an interface when an application is run on an operating system, comprising the steps of:

receiving a request for an interface;

implementing the interface with an upgradable set of methods, properties and events when the interface is identified by a first identifier, said upgradable set of methods, properties and events being available as a result of an upgrade to the operating system; and implementing the interface with a non-upgradable set of methods, properties and events when the interface is not identified by the first identifier.

28. The method according to claim 27, wherein the application is prevented from customizing the interface when the first identifier is used.

29. The method according to claim 27, wherein the operating system examines a control registry to determine the appropriate set of upgradable methods, properties and events when the first identifier is used.

30. A method for using an operating system having a set of original features and an upgraded set of features, comprising:

implementing a control with the upgraded set of features when the control has not been customized; and implementing the control with the set of original features when the control has been customized.

* * * * *

UNITED STATES PATENT AND TRADEMARK OFFICE
CERTIFICATE OF CORRECTION

PATENT NO.    : 6,389,591 B1
DATED         : May 14, 2002
INVENTOR(S)   : Felix Gerard Torquil Ifor Andrew It is certified that error appears in the above-identified patent and that said Letters Patent is hereby corrected as shown below:

Column 2,
Line 59, "fiction" has been replaced with -- function --.

Column 3,
Line 52, "program" has been replaced with -- programs --.

Column 7,
Lines 58 through 67, "Thus, the operating system creates a window using a set of features which are stored in a resource file for the non-annotated classname in step 210. If the classname is annotated, the CreateWindow API determines which classname to use, perhaps using the registry or some customizable/extensible mechanism in step 212. Once the CreateWindow API has looked up the correct classname, the window is created using a set of features which are stired in a resource file for the selected classname in step 214." has been deleted.

Signed and Sealed this

Twenty-fourth Day of December, 2002

JAMES E. ROGAN
*Director of the United States Patent and Trademark Office*